Dec. 20, 1960 A. H. JOBERT 2,964,982
STOCK STOP
Filed Feb. 8, 1954 2 Sheets-Sheet 2

INVENTOR
ARTHUR H. JOBERT
BY Mitchell & Dechert
ATTORNEYS

United States Patent Office 2,964,982
Patented Dec. 20, 1960

---

2,964,982

STOCK STOP

Arthur H. Jobert, New Britain, Conn., assignor to The New Britain Machine Company, New Britain, Conn., a corporation of Connecticut Filed Feb. 8, 1954, Ser. No. 408,905

10 Claims. (Cl. 82—46)

My invention relates to stock-stopping means for an automatic bar machine.

It is an object of the invention to provide improved means of the character indicated.

It is another object to provide improved automatic stock-stopping means, functioning at the cut-off station and requiring minimal time for operation, so that the time required for cut-off, feed-out, and stock-stopping need not constitute a limitation on minimum cutting cycles at other stations of the machine.

It is a further object to provide improved manual actuating means for a stock stop meeting the above objects whereby, in a simple manual operation, the stock stop may be removed from stock-stopping position to permit ejection of a butt of stock, as when a new bar is introduced at a particular spindle location.

One specific object is to provide a stock stop which will automatically reset itself when the operator releases the manual actuating means.

A further specific object is to provide a stock stop which will be withdrawn during the first half of the forward or infeed movement of the cross slide, thereby insuring that the stock stop will be entirely clear of any large end-working tools, such as die heads, which may be brought forward to cut external threads in the cut-off position.

Other objects and various further features of novelty and invention will be pointed out or will occur to those skilled in the art from a reading of the following specification in conjunction with the accompanying drawings. In said drawings, which show, for illustrative purposes only, a preferred form of the invention.

Figure 1:
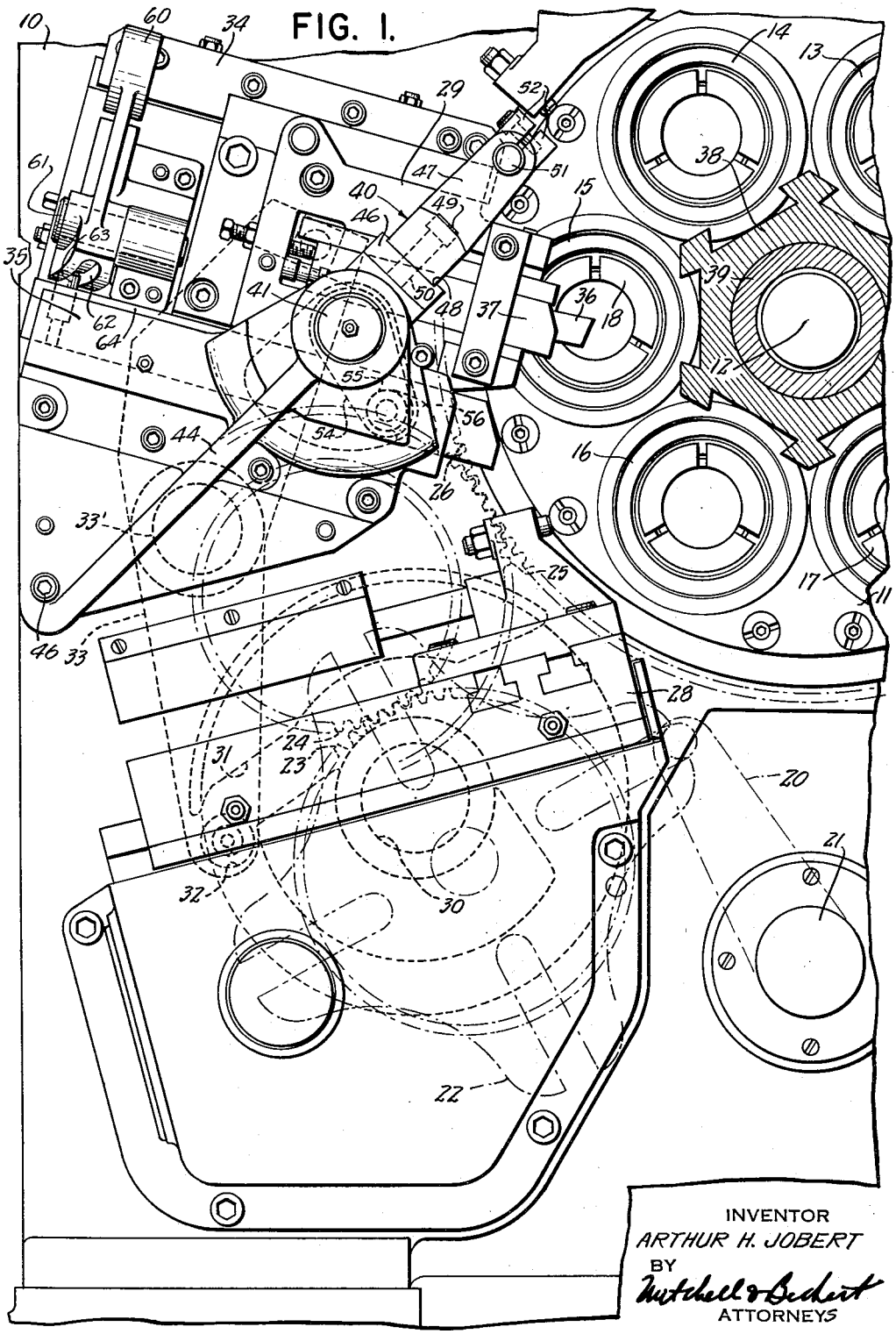
Fig. 1 is a fragmentary end elevation of part of the spindle carrier and of certain cooperating cross-slides in a multiple-spindle machine incorporating features of the invention.

Briefly stated, my invention contemplates an automatically retractable stock stop, for particular use in bar machines in which stock is internally fed through a work-supporting spindle. The stock stop is closely coordinated with the movement of a cross slide as, for example, the cut-off slide, and the arrangement is such that the stock stop is normally in the down or stock-intercepting position as long as the cross slide is in its normally retracted position. The connection between the stock stop and the cross slide is such that the feed of one is accompanied by the retraction of the other, and I provide novel manually operable means carried (in the form shown) by the cross slide for actuating the stock stop, as to remove the same from stock-stopping position when necessary to remove a consumed butt, prior to feed-out of a new bar of stock at a particular spindle location.

Referring to the drawings, my invention is shown in application to a multiple-spindle bar machine comprising frame means 10 supporting a spindle carrier 11 indexible about an indexing axis 12. A plurality of spindles 13—14—15—16—17 may be journalled in the spindle carrier 11 and continuously driven for work at each of a plurality of working stations. Each spindle may be of the internally fed variety and supplied with a nose collet, as at 18 in the case of spindle 16. Indexing may be effected by means of a Geneva mechanism, including an arm 20 operating off the main camshaft 21 at the base of the machine and thus rotating once for each station-cutting cycle. The arm 20 is shown driving a Geneva wheel 22 and, in turn, driving the spindle carrier 11 through appropriate gear trains 23—24 and 25—26, so as to impart the same station index for each full cycle of the arm 20.

Cross-slide means may be provided at each of a plurality of work stations, and in the fragment shown in Fig. 1, a lower cross slide 28 is positioned for operation on work supported at spindle station 16, while a further cross slide 29 is positioned for operation on work supported at spindle station 18. The cross slide 29 may be reciprocally mounted or guided in elongated ways 34—35, fixed to the front face of the spindle side of the machine and aligned generally transversely of the spindle station 18, so as to support the cross slide 29 for movement generally radially of the spindle station 18. For present purposes, it is convenient to employ the cross slide 29 as the cut-off slide, and I have therefore shown a cut-off tool 36 held in a suitable tool holder 37 securely clamped to the cross slide 29 in the customary manner.

An auxiliary camshaft 30 driven by means not shown, but nevertheless operating in one-to-one relation with the main camshaft 21, may provide the basic feed motion for the two cross slides 28—29; but for simplicity of the drawings, I have shown only cam means 31 for driving the cross slide 29, it being understood that similar cam means (also carried by shaft 30) may simultaneously drive the cross slide 28. In the form shown, a feed lever or rocker arm 33 is pivoted at 33' and is connected at its upper end to the cross slide 29; at the lower end of arm 33, a follower roll is positioned by cam 31.

In addition to the cross slides, a so-called Gridley tool slide 38 may be reciprocally guided on a stem 39 connecting the power case (not shown) and the spindle end of the machine, and said Gridley slide 38 may carry a plurality of tools at each of the several working stations of the machine, as needed.

Figure 3:
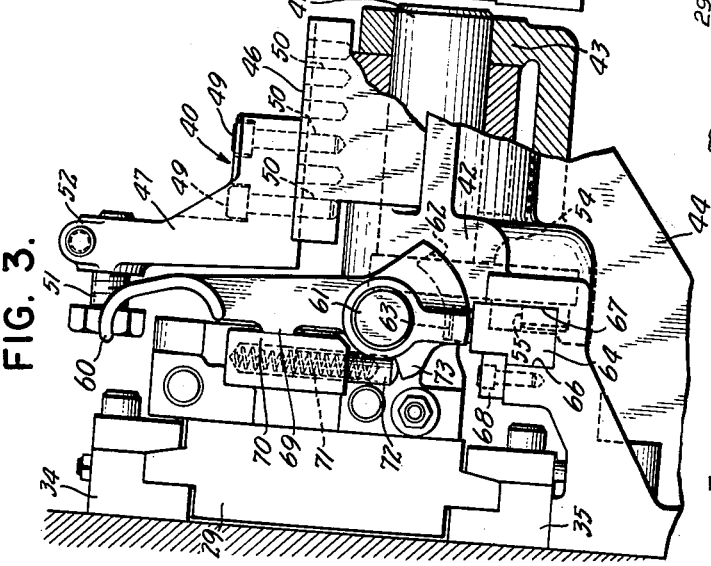
Fig. 3 is an end elevation of parts shown in Fig. 2, with portions broken away and shown in section in the plane 3—3 of Fig. 2, and with the stock-stop arm viewed in abnormal projection, as from the plane 3a—3a of Fig. 2.
Figure 4:
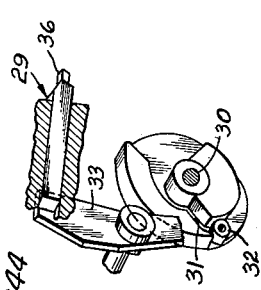
Fig. 4 is a view in perspective showing one cross slide and stock stop with its actuating cam and linkage.

In accordance with the invention, I provide at one of the cross-slide locations stock-stopping means having programmed movements coordinated directly with those of the cross slide associated therewith; for the form described, it is convenient to apply my stock-stopping means, at the cut-off station, that is, in conjunction with the cut-off cross slide 29. The stock stop may be a longitudinally reciprocable bar, but, in the form shown, the stock stop 40 comprises an arm journalled on fixed pivot means 41 and otherwise ruggedly mounted to the frame 10. The pivot means 41 is shown supported at spaced fixed bearings 42—43 (Fig. 3), braced by one or more gussets 44 on an enlarged base plate 45; plate 45 may be bolted, as at 45', to the front face of the spindle end of the machine. Stock-stop arm 40 may be journalled on the pin 41, on an extended base between bearings 42—43, and may project generally radially upward through a frame opening between these bearings. In the form shown, the stock-stop arm is shown comprised essentially of two parts—a first pivoted part 46 mounted on the pin 41, and a second part 47 removably and adjustably secured in guide means 48 on the part 46, as by bolts 49 receivable in various of the plurality of tapped holes 50 in pivoted member 46. Fine adjustment for stock-stopping at a desired feed-out distance may be effected at the end of removable part 47, as by means of a stop bolt 51 adjustably clamped at the split end 52 of arm 47.

Coordinated movement of the cross slide 29 and of the stock stop 40 may be effected by means of a suitable direct interconnection between these parts and, in the form shown, an actuating arm 54 keyed to the pin 41, and therefore also to the arm 46—47, carries a follower roll 55 coacting with a generally L-shaped cam slot 56 forming part of the cross slide 29.

Figure 2:
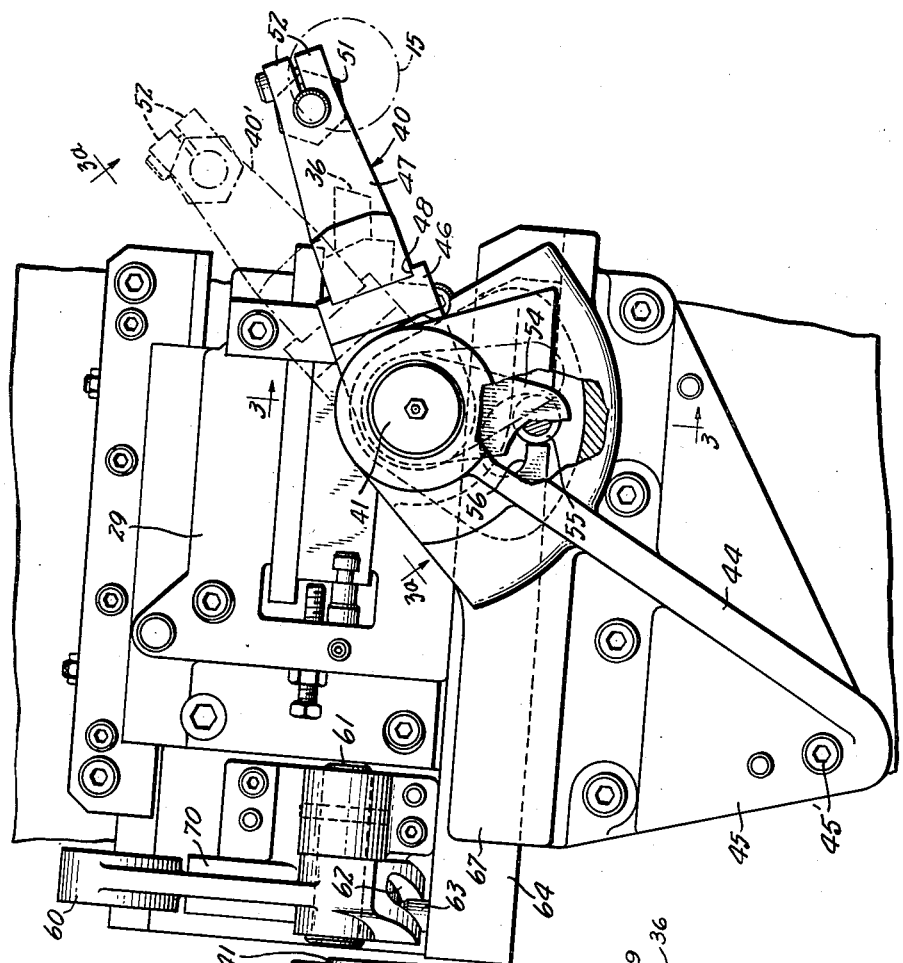
Fig. 2 is a slightly enlarged fragmentary view similar to Fig. 1, but showing certain of the parts of Fig. 1 in a different operating relationship.

The preferred connection established by cam-and-follower means 56—55 is such that for a feeding movement, that is, for movement of cross slide 29 toward the work, the stock stop 40 will be retracted from the stock-stopping position (shown in Fig. 2) to a fully retracted position (shown in Fig. 1). This retraction of the stock stop will take place as the cross slide 29 derives its forward movement from cam 31, and full retraction of the stock stop occurs upon the full in-feed of the cross slide, as suggested by the position of tool 36 in Fig. 1. Retraction of the cross slide 29 will, by the same token, be accompanied by a movement of the stock stop toward the down or stock-intercepting position, and, upon full retraction of the cross slide, the stock stop will reach said down or stock-intercepting position, as shown in Fig. 2. Preferably, however, substantially full retraction of the stock stop 40 occurs during the first half or rapid approach portion of the feed stroke, so that the stock stop 52 will be rapidly snapped so to speak, upwardly to instantly clear the tooling zone so that work working tools may be introduced to the work piece immediately following carrier index, it being understood that any end-working operations in the cut-off position must be completed and the end-working tools withdrawn clear of the work piece while there is still sufficient thickness of stock left at the cut-off zone to prevent the work piece from twisting off onto the tool without increasing the time of the work-piece cycle. It will be appreciated that the L-shaped configuration of cam 56 provides for extremely rapid initial upward movement of the stock stop arm 40 which decelerates to zero as the follower roll 55 rolls the corner of the cam 56 into the dwell section thereof which is parallel to the axis of movement actuating bar 64 so that the arm 47 remains stationary while the tool 36 advances to cut off the finished work piece. After the work piece has been cut off, slide 29 is rapidly withdrawn by the drawback cam 31 and during the initial half of the drawback motion the stock-stop arm 47 remains stationary due to the dwell of cam slot 55; thus cut-off tool 36 is amply clear of arm 47 to permit arm 47 to rock downward at accelerating speed, due to roll 55 rolling the radius of cam 55 to a point where arm 47 is snapped down by the straight vertical portion of cam slot 55 into stock-stop position, as shown in full lines in Fig. 2. The downward movement of the stock stop just described, with particular reference to the final snapping, so to speak, into stopping position, is extremely advantageous in set ups where long piece parts are being made which require an end-working operation in the cut-off position. Frequently in this type of set up there is very little clearance between the end of the end-working tool (such as for instance, a reamer or tap) and the rear end of the stop bolt 51, because the drawn-back position of the tool spindle is limited due to long stock feed, and it is frequently necessary to synchronize the movement of the tool and stock stop so that they barely pass each other without colliding. With such set ups, it is, of course, necessary to delay the movement of the stop into stopping position as much as possible, hence the advantage of substantially snapping the stock stop into position is readily apparent.

In accordance with a further feature of the invention, I provide manually operable means carried by the cross slide 29 for actuating the stock stop 40 when in the down position, as from the position shown in solid outlines in Fig. 2 to the position shown in phantom outlines 40' in Fig. 2, it being understood that the retraction suggested by said phantom outline 40' is sufficient to permit the stock stop to clear any work supported by spindle 15 and thus to permit easy manual removal of the butt end of stock, regardless of its length, without requiring the operator manually to crank the machine to clear the stock stop; important savings in labor and down time result from elimination of this burden on the operator.

In the form shown, the manually operable means for actuating the stock stop 40 employs a crank 60 pivoted at 61 at the back or outer end of the cross slide 29. The crank 60 may be formed at one end with the cam means 62 cooperating with a follower 63, and I find it convenient to mount the follower 63 on the same part 64 of the slide 29 as that which is formed with the cam means 56. However, for independent actuation in response to movement of arm 60, this same part 64 must be independently movable, and I have shown the part 64 as a bar guided for movement parallel to cross-slide movement and, conveniently guide means 66—67 (Fig. 3), formed as part of the base 45. A removable rail 68 may cooperate with one side 66 of the guide means so as to confine the actuating bar 64 to movement only along the ways 66—67. The arm 60 may be formed with a stop or abutment 69, homing on a fixed part 70 of the slide 29 for the unactuated position of arm 60, and I prefer to employ means normally urging the arm 60 to such unactuated position (shown in Fig. 3). The means employed for so urging the arm 60 is a spring 71 driving a pin 72 against a lug or abutment 73, formed as a part of the arm 60. For the unactuated position shown, I prefer that the cam 62 be provided with a dwell (not shown) so that during the normal feed and retraction of the cross slide 29 there will be no tendency to dislodge arm 60 from the position shown in Fig. 3.

In operation, when the machine is running, the stock stop 40 is normally fully retracted (in the phantom position 40' in Fig. 2) and is only projected to the down position (shown in solid outlines in Fig. 2) when the cut-off slide is retracted to the position shown in Fig. 2. Thus, the stock stop will be fully projected into the down position during the period of indexing and will be retracted only to provide clear space, for the cut-off feed operation and for free dropping of the cut-off part when the tool 36 has done its job. Upon completion of cut-off, cam 31 quickly retracts the cut-off slide and projects the stock stop 40 from the position shown in Fig. 1 to the position shown in Fig. 2, thereby permitting rapid opening of collet 18, feed-out of the stock at spindle 15, and resetting of the collet just before indexing. When the bar of stock becomes substantially fully consumed, that is, when it is no longer possible to securely chuck a usable piece, automatic means not shown (as for example, that described in my U.S. Patent No. 2,659,127) may be effective to shut down the machine, or at least to stop spindle rotation, to permit the operator to actuate arm 60; this will retract stock stop 40 to the position shown at 40' in Fig. 2, and the useless butt may be safely and quickly removed. Upon release of the arm 60, spring 71 will return the stock stop to stock-stopping position, so that a new bar of stock may be bumped through the feed finger to the stock-stop. Thereafter, the shut-down parts of the machine may be clutched, for feed-out of a new bar of stock at spindle 15.

It will be appreciated that I have described a relatively simple mechanism for improving the operating efficiency of an automatic bar machine of the character indicated. My invention involves no substantial added complexity at the stock feed-out position and is readily adapted to existing machines. The manual-operating function for the stock stop substantially reduces the down time occasioned when a bar of stock is consumed and is operative only at such time as the cut-off slide may be fully retracted, at which time both the slide and the stock stop may assuredly be out of the way to facilitate greatest access for removal of the butt.

In addition to the direct coordination of cross-slide (cut-off) and stock-stop movements, it will be appreciated that my specific design of cam-and-follower means 55—56 provides a snap action or quick return of the stock stop to retracted position upon the initial or jump feed of the cross slide 29. The arrangement is preferably such as to accomplish sufficient stock-stop retraction to clear any large end-working tools, such as die heads (not shown), which may be brought forward (as by Gridley slide 38) to cut external threads in the cut-off position; in the form shown, essentially only the first half (jump) of the stroke of cross slide 29 fully retracts the stock stop 40. This arrangement will be appreciated as further assuring that the stock stop will be brought down into stopping position essentially only during the last half of the withdrawal stroke of the cross slide 29, thus allowing maximum time for end-working tools to be retracted.

While I have described the invention in detail for the preferred form shown, it will be understood that modifications may be made within the scope of the invention as defined in the claims which follow.

I claim:

1. In a bar machine, a frame, a work-rotating spindle journalled in said frame and including means for supporting internally fed stock therein, cross-slide means supported by said frame for movement generally radially of work rotated by said spindle, work cut-off means carried by said cross-slide means, stock-stop means carried by said frame and including means for removably positioning a part thereof in stock-stopping alignment with said spindle, said part being movable out of stock-stopping alignment with said spindle, said removable-positioning means including manually operable means carried by said cross-slide means for actuating said stock-stop means, and powered means for driving said cross-slide means and said stock-stop means in synchronism so that said stock-stop means is in stock-stopping position when said cross-slide means is retracted and is moved out of stock-stopping position when said cross-slide means is moved toward work rotated by said spindle.

2. In a bar machine, a frame, a work-rotating spindle journalled in said frame and including means for supporting internally fed stock therein, cut-off slide means supported by said frame for movement generally transversely of work rotated by said spindle, stock-stop means including a part removably positionable in stock-stopping alignment with said spindle, said part being movable out of stock-stopping alignment with said spindle, actuating means for said stock-stop means including a part connected directly to said slide means, and powered means for driving said cross-slide means, said actuating means so connecting said slide means and said stock-stop means that said stock-stop means is fed from its retracted position and into stock-stopping position only during the latter half of the retraction stroke of said slide means and is moved out of stock-stopping position in the first half of the feed stroke of said slide means.

3. In a bar machine, a frame, a work-rotating spindle journalled in said frame and including means for supporting internally fed stock therein, cut-off slide means guided by said frame for movement generally radially of work supported in said spindle, stock-stop means including a part removably positionable in stock-stopping alignment with said spindle, actuating means for said stock-stopping means including a part movably supported by said slide means, manual operating means carried by said slide means for actuating said part, and powered means for driving said slide means and said stock-stop means in synchronism so that said stock-stop means is in stock-stopping position when said slide means is retracted and is moved out of stock-stopping position when said slide means is moved toward work supported in said spindle.

4. A bar machine according to claim 3, in which means normally urges the return of said movable part to a normal position in which, for a retraction of said slide means, said stock-stop means is in the down or stock-intercepting position.

5. In a bar machine, a frame and a work-rotating spindle journalled therein, frame-based ways generally transversely aligned with respect to said spindle, a cross slide guided by said ways, cut-off means carried by said cross slide, a stock stop comprising an arm, a frame-based pivot for said arm, and actuating means for pivoting said arm including a connection from said cross slide to said arm; said connection being such that, for a movement of said cross slide toward said spindle, said stock stop will be retracted out of alignment with said spindle, and such that, for a movement of said stock stop into alignment with said spindle, said cross slide will be retracted from said spindle, and powered feed means for said cross slide.

6. In a bar machine, a frame and a work-rotating spindle journalled therein, frame-based ways generally transversely aligned with respect to said spindle, a cross slide guided by said ways, cut-off means carried by said cross slide, a stock stop comprising an arm, a frame-based pivot for said arm, and actuating means for pivoting said arm including a connection from said cross slide to said arm; said connection being such that, for a movement of said cross slide toward said spindle, said stock stop will be retracted out of alignment with said spindle and such that, for a movement of said stock stop into alignment with said spindle, said cross slide will be retracted from said spindle, said connection including a slide bar guided for movement parallel to said ways, manual means carried by said cross slide for actuating said bar, and feed means for said cross slide.

7. A machine according to claim 6, in which said manually operated means includes a cam having a dwell, and means normally holding said cam in the dwell position, whereby, for normal feeds of said cross slide, there need be no tendency to dislodge said manually operable means.

8. In a spindle bar machine, a frame, a spindle carrier, an internally fed work-supporting spindles supported for rotation in said spindle carrier, cross-slide means, cut-off means carried by said cross-slide means, means for reciprocably guiding said cross-slide means with respect to said spindle, powered feed means for said cross-slide means operating in timed relation with said indexing means and functioning to feed said cross-slide means, retractable stock-stop means at said spindle and normally positioned to intercept stock passing through said spindle, an actuating connection directly between said stock-stop means and said cross-slide means, said connection being such that for a feed of said cross-slide means, said stock-stop means will be retracted out of stock-stopping alignment with said spindle, whereby said stock-stop means may normally be in a position to intercept stock fed out at said spindle, so that stock may be fed out and chucked within a minimum period of time after cut-off by said cross-slide means, and manual operating means for retracting said stock-stop means alone and independently of actuation thereof by said feed means.

9. In a bar machine, a frame, a work-rotating spindle journalled in said frame and including means for supporting internally fed stock therein, cross-slide means and guide means for guiding the same generally transversely of work supported in said spindle, cut-off means carried by said cross-slide means, stock-stop means including a part removably positionable in stock-stopping alignment with said spindle, common powered feed means for said cross-slide means and for said stock-stop means and connected to feed said cross-slide means while retracting said stock-stop means, and manual operating means for actuating said stock-stop part alone and independently of actuation thereof by said feed means, said manual means being effective to actuate said stock-stop means out of stock-stopping alignment with work supported in said spindle.

10. In a bar machine, a frame and a work-rotating spindle journalled therein, frame-based ways general transversely aligned with respect to said spindle, a cross slide guided by said ways, cut-off means carried by said cross slide, powered feed means for said cross slide, a stock stop comprising an arm, a frame-based pivot for said arm, and actuating means for pivoting said arm including a direct mechanical connection from said cross slide to said arm; said connection being such that said stock stop is in stock-stopping position when said cross slide is retracted and that, for the stroke of said cross slide toward said spindle, said stock stop is substantially fully retracted out of alignment with said spindle during the first half of said stroke; whereby said stock stop may be quickly retracted to clear an end-working tool during a feed of said cross slide.

References Cited in the file of this patent

UNITED STATES PATENTS

| Number | Name | Date |
|---|---|---|
| 445,294 | Treat | Jan. 27, 1891 |
| 450,147 | Gill | Apr. 14, 1891 |
| 1,279,678 | English et al. | Sept. 24, 1918 |
| 1,419,611 | Buckwalter | June 13, 1922 |
| 1,852,534 | Moore | Apr. 5, 1932 |
| 1,892,327 | Buccicone et al. | Dec. 27, 1932 |
| 1,972,595 | Libby | Sept. 4, 1934 |
| 2,061,417 | Drissner et al. | Nov. 17, 1936 |
| 2,204,405 | Dunlap | June 11, 1940 |
| 2,452,706 | White | Nov. 2, 1948 |
| 2,480,319 | Brodhun | Aug. 30, 1949 |